US007748931B2

(12) United States Patent
Drucker

(10) Patent No.: US 7,748,931 B2
(45) Date of Patent: *Jul. 6, 2010

(54) CHEMICAL INJECTION USING AN ADJUSTABLE DEPTH AIR SPARGING SYSTEM

(75) Inventor: Andrew Scott Drucker, Newbury Park, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 238 days.

This patent is subject to a terminal disclaimer.

(21) Appl. No.: 11/852,660

(22) Filed: Sep. 10, 2007

(65) Prior Publication Data

US 2009/0065408 A1 Mar. 12, 2009

(51) Int. Cl.
B09C 1/08 (2006.01)
(52) U.S. Cl. ............................. 405/128.5; 405/128.15; 405/128.45; 405/128.7; 405/128.75
(58) Field of Classification Search ............ 405/128.15, 405/128.45, 128.5, 128.7, 128.75; 588/320, 588/406; 435/262.5; 166/180, 191, 241.6
See application file for complete search history.

(56) References Cited

U.S. PATENT DOCUMENTS

| 5,560,737 | A * | 10/1996 | Schuring et al. | 405/128.45 |
| 6,173,788 | B1 * | 1/2001 | Lembcke et al. | 166/387 |
| 6,305,878 | B1 * | 10/2001 | Drucker | 405/128.25 |
| 6,872,318 | B2 * | 3/2005 | Kerfoot | 210/747 |
| 2004/0238459 | A1 * | 12/2004 | Whisman, III | 210/759 |
| 2006/0198704 | A1 * | 9/2006 | Kerfoot | 405/128.5 |

* cited by examiner

Primary Examiner—David J Bagnell
Assistant Examiner—Benjamin Fiorello
(74) Attorney, Agent, or Firm—Christopher Blackburn; David Kalmbaugh

(57) ABSTRACT

A supplemental fluid adjustable depth air sparging system which is used to remediate contaminates from groundwater within the soil. An adjustable depth air injection point injects compressed air, and an adjustable depth chemical injection point injects a chemical oxidizer or nutrient into saturated or groundwater regions of the soil's subsurface to remove contaminants including chlorinated solvents from the soil's subsurface.

4 Claims, 6 Drawing Sheets

US 7,748,931 B2

CHEMICAL INJECTION USING AN ADJUSTABLE DEPTH AIR SPARGING SYSTEM

CROSS-REFERENCE TO RELATED APPLICATIONS

This application is co-pending with U.S. patent application Ser. No. 11/852,729, filed Sep. 10, 2007.

BACKGROUND OF THE INVENTION

1. Field of the Invention

The present invention relates generally to a system for removing environmentally harmful contaminants from saturated or ground water regions of the soil subsurface. More specifically, the present invention relates to a system which provides supplemental fluids which are either chemical oxidizers or nutrients which promote accelerated bioremediation of targeted contaminants within the subsurface of the soil and groundwater.

2. Description of the Prior Art

The U.S. Government's Department of Defense estimates that 6,045 of their groundwater sites are either under investigation for environmentally harmful contaminants or identified for future cleanup and restoration. Chlorinated solvents are the most prevalent organic contaminants in groundwater. Chlorinated aliphatic hydrocarbons (CAHs), such as trichloroethylene and perchloroethylene, have been found at approximately 80% of all Superfund sites having groundwater contamination and more than 3000 Department of Defense groundwater contaminated sites in the United States. The life-cycle costs to clean up these sites are uncertain, but are likely to exceed several billions of dollars nationally. The Department of Defense (DOD) could spend more than $100 million annually for hydraulic containment at these sites using, for example, pump-and-treat technologies, and estimates of total life-cycle costs exceed $2 billion. Approximately seventy-one percent of these DOD sites are classified as having groundwater contamination.

One of the technologies currently in use to remediate CAHs found in groundwater is In-situ Chemical Oxidation (ISCO). In-situ chemical oxidation utilizes the introduction of chemical oxidants into the soil's subsurface to destroy organic contaminants in soil and groundwater, with the purpose being to reduce the mass, mobility, and/or toxicity of contamination in soil and groundwater. Although the chemistry of in-situ chemical oxidation is relatively simple, the technology is not a simple one to implement. The soil's subsurface environment can be difficult to control, and it can be difficult to get adequate distribution of the oxidants within the soil's subsurface. Current limitations to properly treat groundwater include the difficulty of bringing reactants into contact with contaminants, located in low permeability matrices in which diffusion and mass transfer are minimal.

Accordingly, there is a need for an effective, efficient and economical sparging system which can deliver either chemical oxidizers to promote contaminant destruction or nutrients to the soil's subsurface to promote accelerated bioremediation of targeted contaminants within the subsurface of the soil and groundwater.

SUMMARY OF THE INVENTION

The present invention overcomes some of the difficulties of the past including those mentioned above in that it comprises a relatively simple yet highly effective and efficient adjustable depth air sparging system which provides for chemical injection and is used to remediate chlorinated solvents from groundwater within the soil.

A first embodiment of the adjustable depth air sparging system, which includes chemical injection, provides for an in-well supplemental stream of fluid at the point of injection of the fluid into the soil. The supplemental fluid is mixed with an air stream exiting a flow-through packer prior to being pushed out of a well screen under pressure at a desired depth of injection.

The adjustable depth air sparging system includes an air supply source and a source for a fluid, such as a chemical oxidizer or nutrient, to treat the soil. An air supply line connects a blower to an adjustable depth flow-through packer.

A fluid supply line connects the source of the chemical oxidizer or nutrient to a well head manifold. The well head manifold is pneumatically sealed using a compression fitting containing a rubber o-ring. The compression fitting prevents the source of air from escaping into the atmosphere through the well head. In addition, the compression fitting seal serves the purpose of mechanically locking the flow-through packer in place at a depth within the soil chosen by an operator. The pressurized air traveling through the flow-through packer inflates the packer, sealing the flow-through packer against the interior wall of a well casing and preventing injected air, chemical oxidizer or a nutrient from flowing back up the well casing. A pump supplies the chemical oxidizer or nutrient from a chemical storage tank to the well head manifold via a flexible hose type supply line. The chemical oxidizer or nutrient, which is under pressure, flows through a supply line located between an air supply tube and the interior wall of the well casing. The air supply tube which connects the blower and external air supply line to the flow-through packer, is located within the well casing. The pressurized air exits the upper portion of the well screen below the inflated flow-through packer. A fluid injector, located at the air injection point within the well screen, injects the chemical oxidizer or nutrient into the air stream. The air stream chemical oxidizer mixture or air stream nutrient mixture under pressure is then driven into the soil forming a chemical oxidizer plum and air channel matrix within the soil. The added chemical oxidizer or nutrient promotes the destruction of chlorinated aliphatic hydrocarbons in groundwater.

DETAILED DESCRIPTION OF THE PREFERRED EMBODIMENTS

Figure 1:
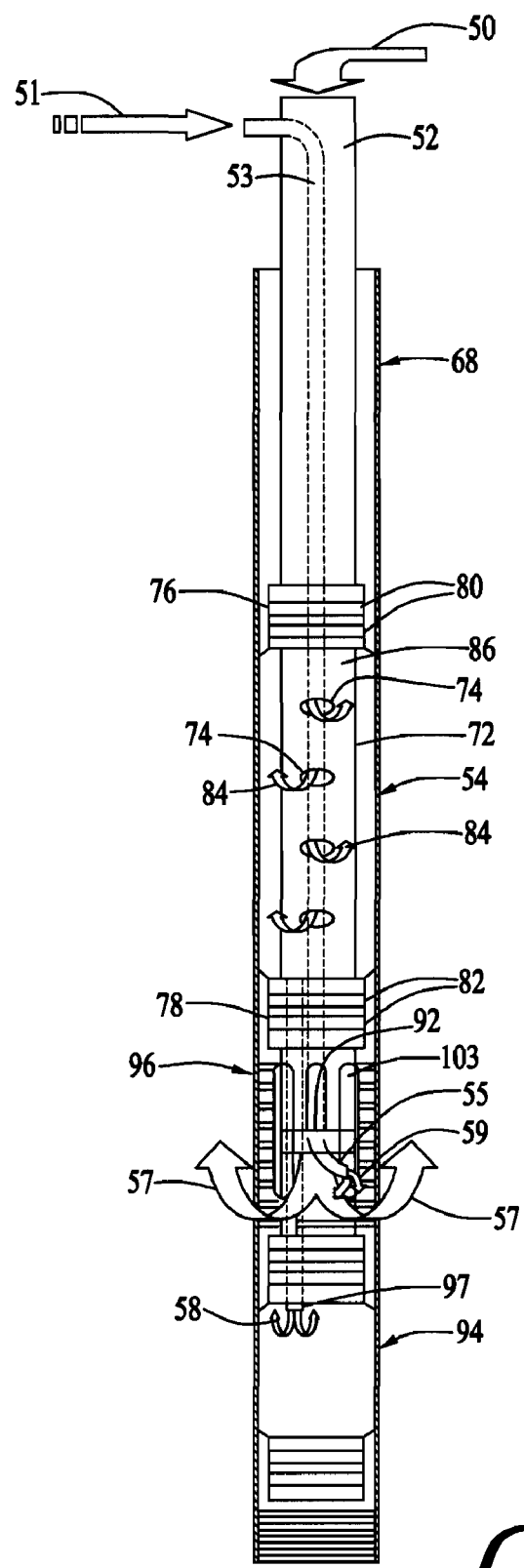
FIG. 1 illustrates an adjustable depth air sparging system in a first embodiment that combines air flow and chemical oxidizer or nutrient at the point of injection of the air flow into the soil.
Figure 3:
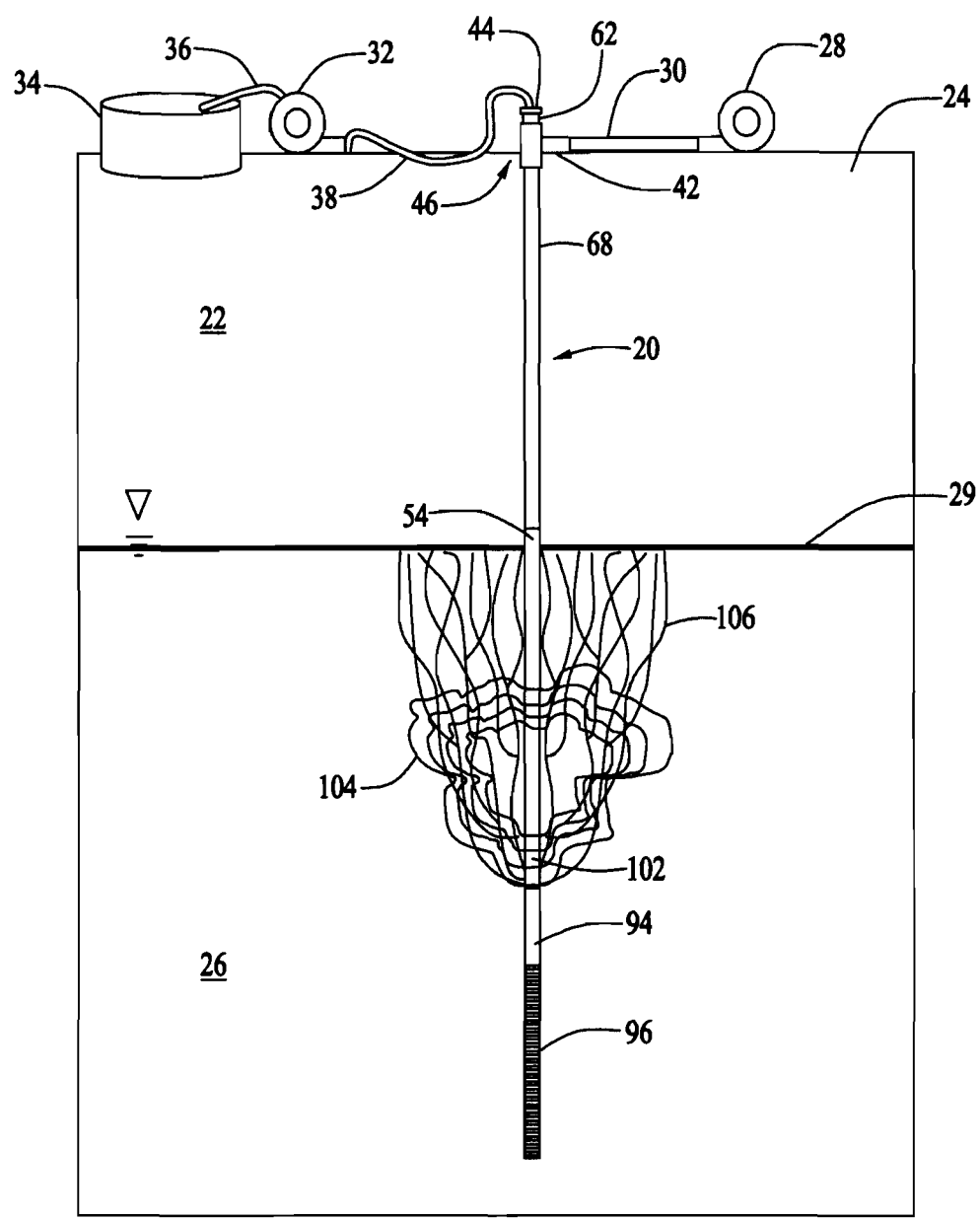
FIG. 3 illustrates a typical air flow pattern which forms to remove contaminants from saturated regions of the soil using the adjustable depth sir sparging system in the first embodiment as presented in FIG. 1.

Referring to FIGS. 1 and 3, FIG. 3 illustrates an adjustable depth air sparging system which provides for chemical injection, designated generally by the reference numeral 20, and which is used to remediate chlorinated solvents from groundwater within the soil 24. These chlorinated solvents are the most prevalent organic contaminants in groundwater and include chlorinated aliphatic hydrocarbons (CAHs), such as trichloroethylene and perchloroethylene. The adjustable depth air sparging system 20 injects air under pressure mixed with a chemical oxidizer or a nutrient into the soil 24 to remediate the soil neutralizing the environmentally harmful contaminants including the CAHs.

As shown FIG. 3, the adjustable depth air sparging system 20 which includes chemical injection is vertically positioned within the soil 24 and passes through the vadoze zone 22 of the soil 24 into the saturated zone 26 of the soil 24. It should be noted that the saturated zone 26 of the soil 24 is homogeneous. Boundary line or water table 29 indicates where in the soil the boundary between vadoze zone 22 and saturated zone 26 occurs.

Adjustable depth air sparging system 20 includes an air blower 28, operating as an air compressor, which supplies pressurized air via an annular air supply line 30 to the air inlet port 42 of a well head air supply manifold 46. The well head air supply manifold 46 is positioned at the upper end of the well casing 68 for an adjustable depth air sparging system 20 which includes chemical injection.

A pump 32 withdraws a chemical oxidizer or a nutrient from a chemical storage tank 34, transferring the chemical oxidizer or nutrient from storage tank 34 to supplement inlet port 44 of manifold 46. A flexible hose 36 connects the fluid inlet port of the pump 32 to storage tank 34, and a flexible hose 38 connects the discharge port of pump 32 to inlet port 44 of manifold 46.

Well head manifold 46 is pneumatically sealed using a compression fitting 62 containing a rubber o-ring. The compression fitting 62 prevents pressurized air and the chemical oxidizer or nutrient from escaping into the above ground environment through the well head. In addition, the rubber o-ring seal of the compression fitting 62 serves the purpose of mechanically locking inflatable flow-through packer 54 (FIG. 1) in place at a pre-selected depth chosen by operator. This prevents vertical movement of the flow-through packer 54 when the adjustable depth air sparging system 20 is operational.

Well head air supply manifold 46 has air inlet port 42 and supplement inlet port 44 for receiving compressed air and the chemical oxidizer or nutrient from storage tank 34.

The packer air stream represented by arrow 50 is supplied to inflatable flow-through packer 54 and a well screen 96 positioned below packer 54. The supplemental fluid is represented by an arrow 51 and may be either a liquid or gaseous chemical oxidizer, a nutrient or co-metabolic gases, or liquid nutrients. The supplemental fluid is delivered to a fluid supply line 53 located within well casing 68 under pressure from pump 32. The supplemental fluid passes through supply line 53 within the well casing 68 to a fluid injector 55. The supplemental fluid exiting the fluid injector 55 mixes with compressed air from blower 28 and exits the adjustable depth air sparging well system 20 through well screen 96.

Arrows 57 illustrate the supplemental fluid, air pressure mixture exiting through the well screen 68 of adjustable depth air sparging system 20. Arrows 59 depict the flow of the supplemental fluid as the supplemental fluid mixes with the compressed air.

Blower 28 is capable of supplying pressurized air at flow rates of between 5 scfm and 40 scfm to inflatable flow-through packer 54 and screened well 96 which is that portion of a well casing 68 extending into the soil's saturated zone 26. Blower 28 is also capable of supplying pressurized air (represented by arrows 58) to a secondary bottom packer 94. The bottom packer 94 is needed to prevent liquid oxidizer or nutrient from sinking within the well prior to injection into the groundwater.

Positioned at the lower end of a flow-through packer air supply tube 52 is a check valve and pressure regulator 92. The check valve and pressure regulator 92 has a pressure regulator screen fitted to the regulator's compressed air exit port to prevent sediment from entering the flow-through packer 54. Air under pressure passes through the valve and regulator 92 in the manner indicated by arrows 57. The pressurized air mixed with the supplemental fluid next passes through well screen 96 (also depicted by arrows 57) into the soil's saturated zone 26.

The well head air supply manifold 46 is used to connect air supply line 30 to air supply tube 52. This allows air blower 28 to supplying pressurized air at the flow rates of between 5 scfm and 40 scfm to inflatable flow-through packer 54 and well screen 96 which is that portion of well casing 68 extending into the soil's saturated zone 26.

The flow-through packer 54 comprises an inflatable packer fabricated from inflatable elastomeric tubing, a lower end portion 72 of air supply tube 52 which has a plurality of openings 74, and a pair of elastomeric packer end caps 76 and 78. Packer end cap 76 is secured to the lower end portion 72 by a first stainless steel strapping 80. Packer end cap 78 is also secured to the lower end portion 72 by a second stainless steel strapping 82. Stainless steel straps 80 and 82 respectively seal end caps 76 and 78 to packer air supply tube 52 in the manner illustrated in FIG. 1.

When air under pressure passes through openings 74 (in the manner indicated by arrows 84) the outer surface 86 of packer 54 presses against the inner surface of well casing 68 which assist in holding adjustable depth inflatable flow-through packer 54 in a fixed position within well casing 68. When inflatable packer 54 is not under pressure, inflatable packer 54 deflates which allows for vertical movement of flow-through packer 54 within well casing 68. When inflatable packer 54 is inflated a seal is formed which prevents injected air from reentering the well casing 68 and subsequently short circuiting air flow through the contaminated regions of the soil's saturation zone 26.

At this time it should be noted that flow-through packer air supply tube 52 has an outside diameter of approximately 0.5-1.0 inches, while well casing 68 has an inside diameter of approximately 1.0-2.5 inches.

There is an inflated secondary bottom packer 94 which is inflatable. Inflated secondary bottom packer 94 is inflated by the compressed air (represented by arrows 58) exiting injection point 97. The inflated secondary bottom packer 94 operates in the same manner as packer 54. When air under pressure enters inflated secondary bottom packer 94 through injection point 97 (in the manner indicated by arrows 58) the outer surface of packer 94 presses against the inner surface of well casing 68 which assist in holding inflated secondary bottom packer 94 in a fixed position within well casing 68.

As shown in FIG. 3, adjustable depth air sparging system 20 injects air under pressure mixed with a chemical oxidizer or a nutrient into the soil's saturated zone 26 to remediate the groundwater neutralizing the environmentally harmful contaminants including chlorinated aliphatic hydrocarbons (CAHs), such as trichloroethylene and perchloroethylene in the soil's saturated zone 26. The injected air and chemical oxidizer or nutrient mixture is injected into the saturated soil at an air and oxidizer outlet 102 which has a plurality of elongated openings 103 within well casing 68 forms a chemical oxidizer plume 104 and an air channel matrix 106. The chemical oxidizer or nutrient mixture and air channel matrix provide a means for the efficient and effective removal of environmentally harmful contaminants including CAHs from the saturated soil.

Figure 4:
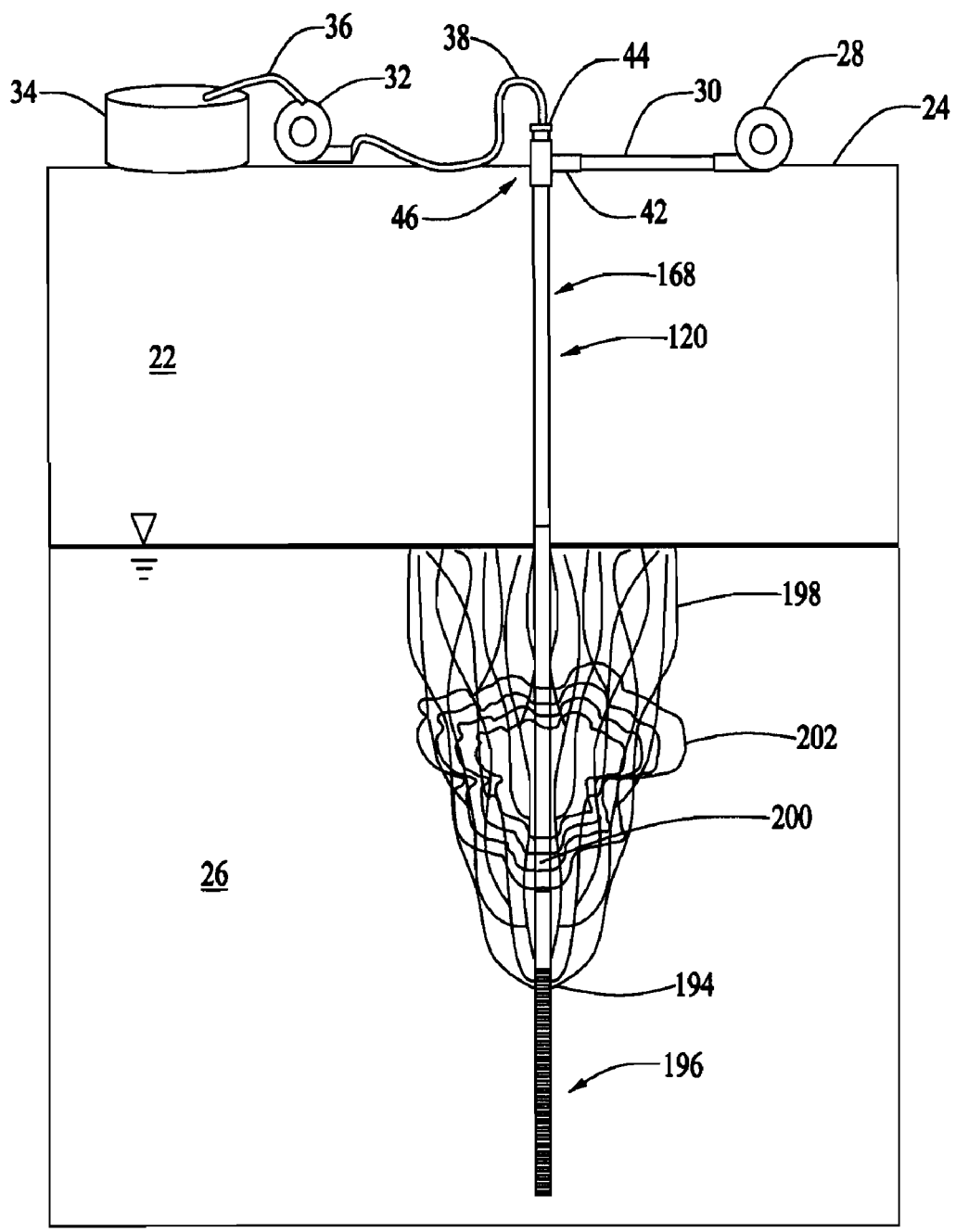
FIG. 4 illustrates a typical air flow pattern which forms to remove contaminants from saturated regions of the soil using the adjustable depth sir sparging system in the second embodiment as presented in FIG. 2.

Referring to FIGS. 3 and 4, there is shown a second embodiment of the adjustable depth air sparging system which provides for chemical injection, designated generally by the reference numeral 120, and which is used to remediate chlorinated solvents from groundwater within the soil 24.

The packer air stream, represented by arrow 150, is supplied to an inflatable flow-through packer 154, and an inflatable secondary flow-through packer 160. The supplemental fluid is represented by an arrow 151 and may be either a liquid or gaseous chemical oxidizer, a nutrient or co-metabolic gas, or liquid nutrient. The supplemental fluid is delivered to a fluid supply line 153 located within well casing 168 under pressure from pump 132. The supplemental fluid passes through supply line 53 within the well casing 68 to a fluid injector 155. The supplemental fluid exits the fluid injector 155 and then through a plurality of elongated openings 159 within well casing 168 into the saturated soil 26.

The pressurized air 150 flows downward through a flow-through packer air supply tube 152 within well casing 168 and then through inflatable flow-through packer 154, and inflatable secondary flow-through packer 160 to a check valve 191 and air pressure regulator 192.

The check valve 191 and pressure regulator 192 are positioned at the lower end of a flow-through packer air supply tube 152 below the secondary flow-through packer 160. The pressure regulator 192 has a pressure regulator screen fitted to the regulator's compressed air exit port to prevent sediment from entering the flow-through packers 154 and 160. Air under pressure passes through the valve 191 and regulator 192 exiting the regulator 192. The pressurized air next passes through well screen 196 into the soil's saturated zone 26.

Figure 2:
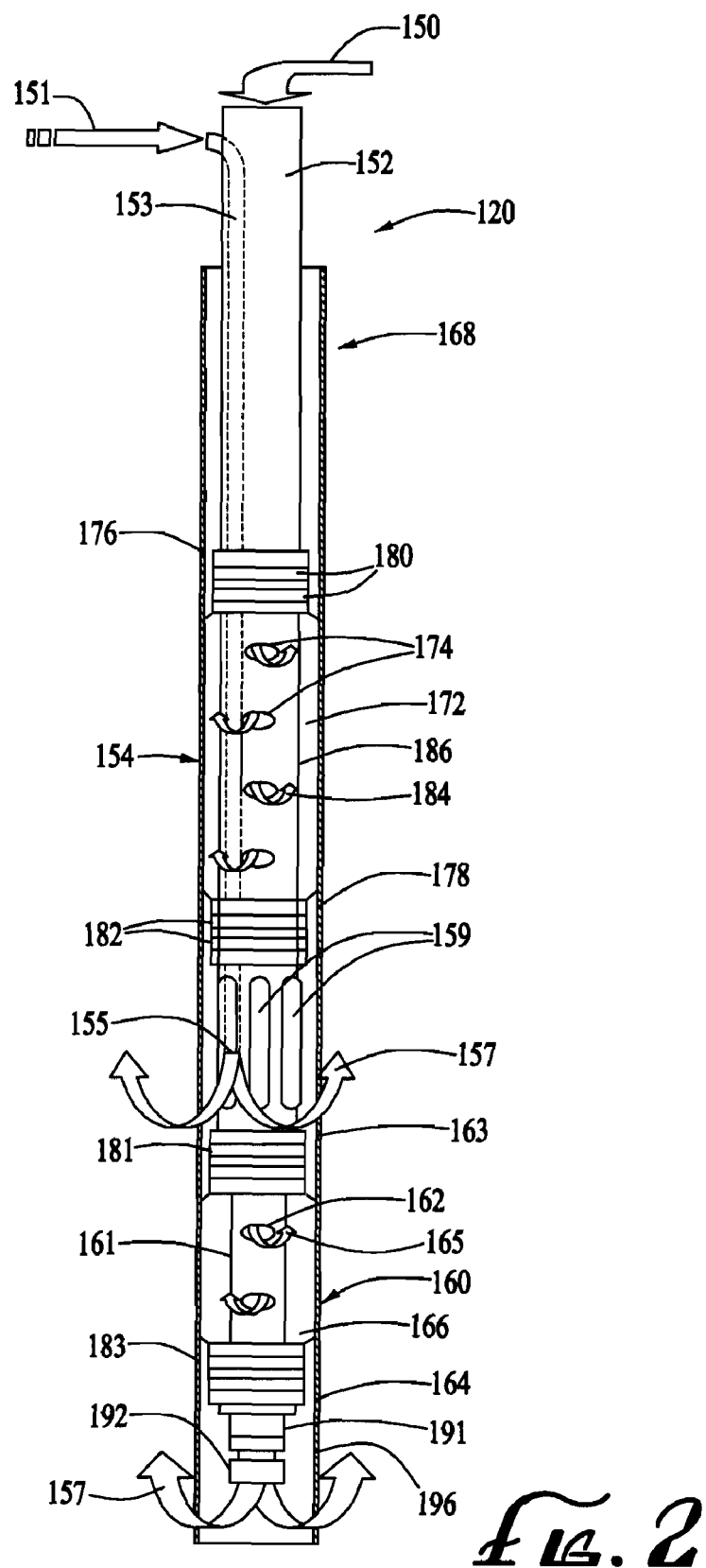
FIG. 2 illustrates an adjustable depth air sparging system in a second embodiment that separates the air flow injection point below the chemical oxidizer or nutrient point of injection into the soil.

The flow-through packer 154 comprises an inflatable packer fabricated from inflatable elastomeric tubing, a lower portion 172 of air supply tube 152 which has a plurality of openings 174, and a pair of elastomeric packer end caps 176 and 178. Packer end cap 176 is secured to one end of lower portion 172 by a first stainless steel strapping 180. Packer end cap 178 is also secured to the other end of lower portion 172 by a second stainless steel strapping 182. Stainless steel straps 180 and 182 respectively seal end caps 176 and 178 to packer air supply tube 152 in the manner illustrated in FIG. 2.

When air under pressure passes through openings 174 (in the manner indicated by arrows 184) the outer surface 186 of packer 154 presses against the inner surface of well casing 168 which assist in holding adjustable depth inflatable flow-through packer 154 in a fixed position within well casing 168. When inflatable packer 154 is not under pressure, inflatable packer 154 deflates which allows for vertical movement of flow-through packer 154 within well casing 168. When inflatable packer 154 is inflated a seal is formed which prevents injected air from reentering the well casing 168 and subsequently short circuiting air flow through the contaminated regions of the soil's saturation zone 26.

The secondary flow-through packer 160 comprises an inflatable packer fabricated from inflatable elastomeric tubing, an end portion 161 of air supply tube 152 which has a plurality of openings 162, and a pair of elastomeric packer end caps 163 and 164. Packer end cap 163 is secured to one end of end portion 161 by a first stainless steel strapping 181. Packer end cap 164 is also secured to the other end of end portion 161 by a second stainless steel strapping 183. Stainless steel straps 181 and 183 respectively seal end caps 163 and 164 to packer air supply tube 152 in the manner illustrated in FIG. 2.

When air under pressure passes through openings 162 (in the manner indicated by arrows 165) the outer surface 166 of packer 160 presses against the inner surface of well casing 168 which assist in holding secondary flow-through packer 160 in a fixed position within well casing 168. When flow-through packer 160 is not under pressure, flow-through packer 160 deflates which allows for vertical movement of flow-through packer 160 within well casing 168. When flow-through packer 160 is inflated, a seal is formed which prevents injected air from reentering the well casing 168 and subsequently short circuiting air flow through the contaminated regions of the soil's saturation zone 26.

Referring to FIGS. 3 and 4, air blower 28, operating as an air compressor, supplies pressurized air via an annular air supply line 30 to the air inlet port 42 of a well head air supply manifold 46. The compressed air then flows downward under pressure through packer air supply tube 52 to the check valve 191 and pressure regulator 192.

Air under pressure passes through the valve 191 and regulator 192 exiting the regulator 192 in the manner indicated by arrows 157. The pressurized air next passes through well screen 196 at the air outlet 194 into the soil's saturated zone 26. The pressurized air exiting the well screen 196 at the air outlet 194 forms an air channel matrix 198 which flows upward through the soil's saturated zone 26 in the manner illustrated in FIG. 4.

Pump 32 withdraws a chemical oxidizer or a nutrient from chemical storage tank 34, transferring the chemical oxidizer or nutrient from storage tank 34 to supplement inlet port 44 of manifold 46. The chemical oxidizer or nutrient passes through flexible hose 36 to the fluid inlet port of the pump 32, and then through the discharge port of pump 32 and flexible hose 38 to the inlet port 44 of manifold 46.

The chemical oxidizer or nutrient travels downward under pressure through fluid supply line 153 to fluid injector 155. The supplemental fluid then exits the fluid injector 155 and passes through a plurality of elongated openings 159 within well casing 168 into the soil's saturation zone 26. The chemical oxidizer or nutrient exits the well casing 168 of adjustable depth air sparging system 120 at the oxidizer outlet 200 forming a chemical oxidizer plume 202 within the soil's saturation zone 26. The chemical oxidizer plume 202 and the air channel matrix 198 are used to remove environmental contaminants from the soil's saturation zone 26 including the chlorinated aliphatic hydrocarbons.

Figure 5:
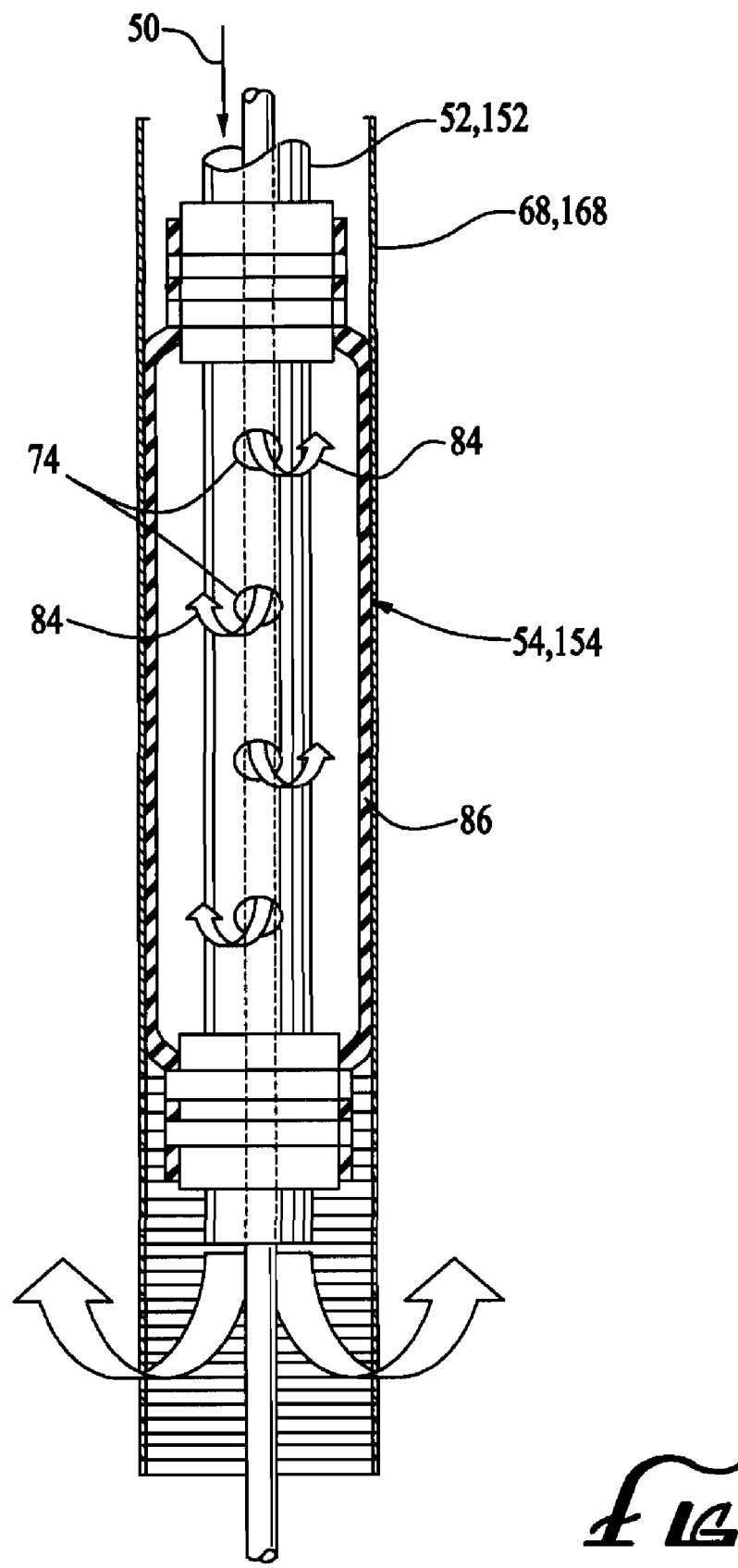
FIG. 5 is an enlarged view illustrating an inflatable flow-through packer positioned and locked into place within the well casing of the adjustable depth air sparging system comprising the present invention.
Figure 6:
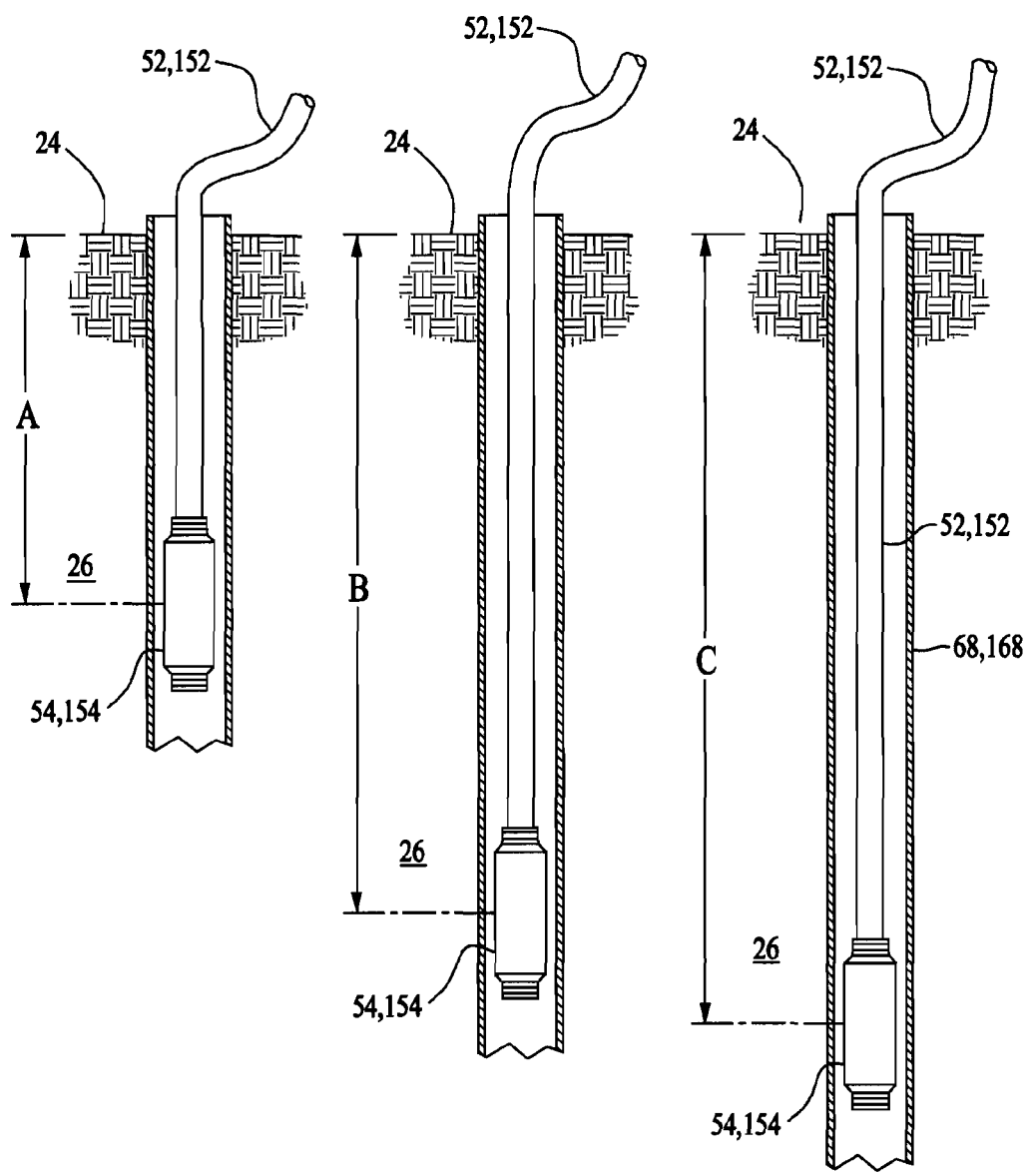
FIG. 6 is a view illustrating the positioning of an inflatable flow-through packer within the well casing of the adjustable depth air sparging system at a various depths within the soil's contaminated subsurface.

Referring to FIGS. 5 and 6, FIG. 5 is an enlarged view illustrating an inflatable flow-through packer 68 or 168 positioned and locked into place within the well casing 54 or 154 of the adjustable depth air sparging system 20 (FIG. 3) comprising the present invention. As seen in FIG. 5, when air (represented by arrow 50) under pressure passes from air supply tube 52 or 152 through openings 74 in tube 52 or 152 (in the manner indicated by arrows 84) the outer surface of the elastomeric material 86 of packer 54 or 154 inflates and then presses against the inner surface of well casing 68 or 168 which locks the adjustable depth inflatable flow-through packer 54 or 154 in a fixed position within well casing 68 or 168. When inflatable packer 54 or 154 is not under pressure, inflatable packer 54 or 154 deflates which allows for vertical movement of flow-through packer 54 or 154 within well casing 68 or 168. When inflatable packer 54 or 154 is inflated in the manner shown in FIG. 5, a seal is formed between the packer 54 or 154 and well casing 68 or 168 which prevents injected air from reentering the well casing 68 or 168 and subsequently short circuiting air flow through the contaminated regions of the soil's saturation zone 26 (FIG. 3). As shown in FIG. 5, the packers 54 or 154 and the well casing 68 or 168 are clearly separate and distinct elements of the adjustable depth air sparging system 20 (FIG. 3) comprising the present invention. FIG. 6 depicts the positioning of a flow-through packer 54 or 154 at various depths A, B and C within the well casing 68 or 168. The well casing 68 or 168 is driven into the saturated zone 26 of the soil 24 to remove volatile contaminants from the soil 24 in the manner illustrated in FIG. 3. The air supply tubes 52 and 152 are flexible air supply tubes which are lowered into the interior of the well casing 68 or 168 to allow for positioning of the flowing-through packer 54 or 154 within the well casing 68 or 168 at various depths within the soil's subsurface in the manner illustrated in FIG. 6. The use of a flexible air supply tube as the air supply line 52 and 152 allows for vertical movement upward and downward of the flexible supply line 52 and 152 within the well casing 68 or 168.

In operation, the user first lowers the flow-through packer 54 or 154 to a desired depth A in the subsurface of the soil 24. The user then inflates the packer 54 or 154 in the manner shown in FIG. 5 to secure the flow-through packer 54 or 154 in the desired position within the subsurface of the soil 24. The rubber o-ring seal of the compression fitting 62 also serves the purpose of mechanically locking inflatable flow-through packer 54 (FIG. 1) in place at a pre-selected depth A chosen by operator. These features prevents vertical movement of the flow-through packer 54 from the pre-selected depth A when the adjustable depth air sparging system 20 is operational.

The user next lowers the flow-through packer 54 or 154 to a desired depth B in the subsurface of the soil 24. The user again inflates the packer 54 and 154 in the manner shown in FIG. 5 to secure the flow-through packer 54 or 154 in the second desired position B within the subsurface of the soil 24.

Finally, the user next lowers the flow-through packer 54 or 154 to a desired depth C in the subsurface of the soil 24. The user again inflates the packer 54 and 154 in the manner shown in FIG. 5 to secure the flow-through packer 54 or 154 in the third desired position C within the subsurface of the soil 24. The depths A, B and C may be, for example, respectively ten feet, fifteen feet and twenty feet within the subsurface of the soil 24.

From the foregoing, it is readily apparent that the present invention comprises a new, unique, and exceedingly useful supplemental fluid adjustable depth air sparging system for removing contaminants from saturated and groundwater regions of the soil which constitutes a considerable improvement over commercially chemical oxidizer and nutrient injecting systems which rely on limited mechanism to help push or distribute supplemental fluids throughout the contaminated region of the soil's saturated zone.

What is claimed is:

1. An adjustable depth air sparging system which uses chemical injection for removing contaminants including chlorinated aliphatic hydrocarbons from a saturated zone within the soil subsurface comprising:

(a) a vertically oriented well casing extending downward into the saturated zone within the soil subsurface, said well casing having a screened portion at a lower end thereof positioned within said saturated zone;

(b) an air supply tube movably disposed within said well casing, said air supply tube having a first plurality of openings positioned within a lower portion of said air supply tube and a second plurality of openings positioned at a lower end of said air supply tube, wherein said air supply tube is fabricated to allow for vertical movement of said air supply tube within said well casing;

(c) an air blower connected to said air supply tube for providing pressurized air to said air supply tube;

(d) a first flow-through air sparge packer affixed to the lower portion of said air supply tube, said first flow-through air sparge packer covering the first plurality of openings within said air supply tube forming an air tight seal around the first plurality of openings in the lower portion of said air supply tube;

(e) a second flow-through air sparge packer affixed to the lower end of said air supply tube, said second flow-through covering the second plurality of openings within said air supply tube forming an air tight seal around the second plurality of openings in the lower end of said air supply tube, wherein said air supply tube is lowered into the interior of said vertically orientated well casing to allow for positioning of said first and second flowing-through packers within said well casing at various depths within the soil subsurface;

(f) a check valve and pressure regulator affixed to the lower end of said air supply tube to receive said pressurized air, said check valve and pressure regulator injecting said pressurized air through the screened portion of said well casing below said second flow-through air sparge packer into said saturated zone at a first plurality of pre-selected depths, forming air channels at each of said first plurality of pre-selected depths through which said pressurized air flows to remove said contaminants from said saturated zone, wherein a user of said air sparging system selects each of said first plurality of pre-selected depths at which said check valve and pressure regulator is positioned within said saturation zone prior to activating said air sparging system;

(g) a fluid supply line movably disposed within said well casing adjacent said air supply tube;

(h) a fluid supply pump connected to said fluid supply line for providing a chemical oxidizer or a nutrient to said fluid supply line under pressure, wherein said fluid supply pump receives said chemical oxidizer or said nutrient from a chemical storage tank and provides said nutrient to said fluid supply line under pressure;

(i) a fluid injector located between said first flow-through air sparge packer and said second flow-through air sparge packer within said well casing, said fluid injector being connected to said fluid supply line to receive said chemical oxidizer or said nutrient, wherein said fluid injector injects said chemical oxidizer or said nutrient through a plurality of elongated openings within said well casing into said saturated zone at a second plurality of pre-selected depths, forming a chemical oxidizer plume at each of said second plurality of pre-selected depths through which said chemical oxidizer or said nutrient flows to remove said chlorinated aliphatic hydrocarbons from said saturated zone; and (j) a locking mechanism located at an upper end of said well casing for locking said first and second packers and said check valve and pressure regulator in a fixed position at each of said first plurality of pre-selected depths to prevent the vertical movement of said check valve and pressure regulator when said air sparging system is operational, wherein said locking mechanism is a well head manifold which is connected to said air blower to receive said pressurized air from said air blower and said fluid supply pump to receive said chemical oxidizer or said nutrient from said fluid supply pump, said well head manifold being pneumatically sealed using a compression fitting containing a rubber o-ring, said compression fitting of said well head manifold preventing said pressurized air and said chemical oxidizer or said nutrient from escaping into the atmosphere through said well head manifold.

2. The adjustable depth air sparging system of claim 1 wherein said pressure regulator includes a pressure regulator screen fitted to a compressed air exit port for said pressure regulator to prevent sediment from entering the flow-through packers.

3. The adjustable depth air sparging system of claim 1 wherein said first flow-through air sparge packer and said second flow through-air sparge packer are each fabricated from inflatable rubber or elastomeric tubing.

4. The adjustable depth air sparging system of claim 1 wherein said first flow through air sparge packer and said second flow-through air sparge packer comprise:
(a) first and second end caps, said first end cap being located at an upper end of said first flow-through air sparge packer and said second end cap being located at a lower end of said first flow-through air sparge packer, said first and second end caps being adapted to secure said first flow-through air sparge packer to the lower portion of said air supply tube and said first and second end caps being adapted to secure said second flow-through air sparge packer to the lower end of said air supply tube, wherein said first and second end caps are fabricated from rubber or an elastomer;
(b) a first stainless steel strapping mounted on said first end cap, said first stainless steel strapping when tightened securing said first end cap to said air supply tube; and
(c) a second stainless steel strapping mounted on said second rubber end cap, said second stainless steel strapping when tightened securing said second end cap to said air supply tube.

* * * * *